United States Patent [19]
Feygin et al.

[11] Patent Number: 5,730,817
[45] Date of Patent: Mar. 24, 1998

[54] LAMINATED OBJECT MANUFACTURING SYSTEM

[75] Inventors: Michael Feygin, Rancho Palos Verdes; Alexandr Shkolnik, Los Angeles; Michael N. Diamond, Torrance; Emmanuil Dvorskiy, Los Angeles, all of Calif.

[73] Assignee: Helisys, Inc., Torrance, Calif.

[21] Appl. No.: 635,506

[22] Filed: Apr. 22, 1996

[51] Int. Cl.$^6$ ............................. B32B 31/00; B44C 3/02
[52] U.S. Cl. ........................ 156/64; 156/256; 156/264; 156/267; 156/358; 156/359; 156/512; 156/516; 156/517
[58] Field of Search ......................... 156/64, 358, 264, 156/512, 517, 516, 359, 256, 267

[56] References Cited

U.S. PATENT DOCUMENTS

| | | |
|---|---|---|
| 702,615 | 6/1902 | Barden . |
| 1,524,972 | 2/1925 | Hampson et al. . |
| 2,138,024 | 11/1938 | Cheesman . |
| 2,242,631 | 5/1941 | Stillman . |
| 2,556,798 | 6/1951 | Concordet . |
| 3,137,080 | 6/1964 | Zang . |
| 3,280,230 | 10/1966 | Bradshaw, Jr. et al. . |
| 3,301,725 | 1/1967 | Frontera . |
| 3,534,396 | 10/1970 | Hart et al. . |
| 3,539,410 | 11/1970 | Meyer . |
| 3,551,270 | 12/1970 | Sharkey . |
| 3,589,507 | 6/1971 | Greenberg . |

(List continued on next page.)

FOREIGN PATENT DOCUMENTS

| | | |
|---|---|---|
| 906643 | 8/1972 | Canada . |
| 491355 | 6/1992 | European Pat. Off. . |
| 2368101 | 6/1978 | France . |
| 2263777 | 7/1973 | Germany . |
| 2743544 | 3/1979 | Germany . |
| 60-102234 | 6/1985 | Japan . |
| 60-102236 | 6/1985 | Japan . |
| 23709 | of 1901 | United Kingdom . |
| 652969 | 5/1951 | United Kingdom . |
| 0938455 | 10/1963 | United Kingdom . |

OTHER PUBLICATIONS

Plastics World, (Aug. 1992) "Latest wrinkle in fast prototyping," p. 23.
News Release (4 Apr. 1991) "New Laser Prototyping System Goes into Production," p. 1.
Photonics Spectra, (May 1992) "Laser Sheet Material Creates 3D Models," pp. 22–24.
Incropera, et al., "Fundamentals of Heat Transfer," John Wiley & Sons, NY 1981 p. 544.

(List continued on next page.)

*Primary Examiner*—Jeff H. Aftergut
*Attorney, Agent, or Firm*—Knobbe, Martens, Olson & Bear, LLP

[57] ABSTRACT

A laminated object manufacturing (LOM) system for forming a plurality of laminations into a stack to create a three-dimensional object. The system includes an X-Y plotter device positioned above a work table, the work table being vertically movable. The X-Y plotter device includes a forming tool for forming a layer from a sheet of material positioned on the work table. The layers are bonded to each other with heat sensitive adhesives provided on one side thereof. A bonding tool or fuser is mounted to translate across the work table and apply a lamination force and heat to each of the layers. The X-Y plotter device and bonding tool are mounted to translate along rails mounted on a common reference frame. The reference frame includes two rigid beams positioned on a base frame. A sensor is provided between the bonding tool and the reference frame to sense the force applied by the bonding tool to the laminations and adjust the height of the work table in response thereto. An infrared sensor senses the temperature of the layers to also provide feedback to a control device for adjusting the speed of the bonding tool. The forming tool may be a laser system which includes a laser mounted to the reference frame, a plurality of mirrors, and a lens mounted on the X-Y plotter device.

41 Claims, 10 Drawing Sheets

U.S. PATENT DOCUMENTS

| | | |
|---|---|---|
| 3,932,923 | 1/1976 | DiMatteo . |
| 4,041,476 | 8/1977 | Swainson . |
| 4,078,229 | 3/1978 | Swanson et al. . |
| 4,196,737 | 4/1980 | Bevilacqua . |
| 4,238,840 | 12/1980 | Swainson . |
| 4,288,861 | 9/1981 | Swainson et al. . |
| 4,323,756 | 4/1982 | Brown et al. . |
| 4,361,262 | 11/1982 | Israeli . |
| 4,393,450 | 7/1983 | Jerard . |
| 4,575,330 | 3/1986 | Hull . |
| 4,665,492 | 5/1987 | Masters . |
| 4,687,526 | 8/1987 | Wilfert . |
| 4,752,352 | 6/1988 | Feygin . |
| 4,752,498 | 6/1988 | Fudim . |
| 4,801,477 | 1/1989 | Fudim . |
| 4,814,296 | 3/1989 | Jedlicka et al. . |
| 4,847,137 | 7/1989 | Kellen et al. . |
| 4,863,538 | 9/1989 | Deckard . |
| 4,880,486 | 11/1989 | Maeda . |
| 4,945,203 | 7/1990 | Soodak et al. . |
| 4,961,154 | 10/1990 | Pomerantz et al. . |
| 5,002,854 | 3/1991 | Fan et al. . |
| 5,015,312 | 5/1991 | Kinzie . |
| 5,037,416 | 8/1991 | Allen et al. . |
| 5,057,167 | 10/1991 | Gersbeck ............................ 156/358 X |
| 5,061,337 | 10/1991 | Fraser ................................. 156/358 X |
| 5,071,503 | 12/1991 | Berman . |
| 5,088,047 | 2/1992 | Bynum . |
| 5,094,935 | 3/1992 | Vassiliou et al. . |
| 5,174,843 | 12/1992 | Natter . |
| 5,183,598 | 2/1993 | Helle et al. ......................... 156/264 X |
| 5,192,559 | 3/1993 | Hull et al. . |
| 5,514,232 | 5/1996 | Burns . |

OTHER PUBLICATIONS

Feygin, M., "Laser CIM in 3–D Complex Objects Production," *Industrial Laser Review* Jun. 1987.

Kunieda, et al., "Manufacturing of Laminated Deep Drawing Dies by Laser Beam Cutting." Proceedings of the First International Conference on Technology of Plasticity *Advanced Technology of Plasticity* 1984, Val. pp. 520–525.

"Sculpting Parts With Light," *Machine Design* (Mar. 6, 1986).

Pomerantz, "Automated Modeling Machines," NCGA 1989 Conference Proceedings, Apr. 17–20, 1989 (Cubital).

"Desktop Mgg." published report, Technical Insights, Inc., 1988 (Desktop Mfg. Inc./University of Texas).

Nakagawa, T., "Laser cut sheet laminated forming dies by diffusion bonding," *Proceedings of the Twenty–Fifth International Machine Tool Design and Research Conference* Birmingham, 22nd–24th Apr. 1985, pp. 505–510.

Article of Dr. Takeo Nakagawa, in Magazine "NEC Factory Engineering", vol. 34, published: Jul. 20, 1984.

Article of M. Kunieda and Takeo Nakagawa, published in Bul. Japan Soc. of Prec. Engg., vol. 18, No. 4 (Dec. 1984), pp. 353, 354.

Takeo Nakagawa, M. Kunieda and Sheng–Dong Liu in Proc. of 25th International Machine Tool Design Research Conference, pp. 505–510, published in 1984.

Takeo Nakagawa, International Forum 1985 on Die and Mold, New Developments in the Manufacturing of Die and Mold, pp. 209–218, published in 1985.

Retallick, D.A., Switching theory Applied to Fluidic digital Systems, University of Birmingham, Sep. 1968.

LAMINATED OBJECT MANUFACTURING SYSTEM

BACKGROUND OF THE INVENTION

1. Field of the Invention

The present invention relates to a laminated object manufacturing (LOM) system and, more particularly to improvements in the dimensional and bonding quality of three-dimensional objects formed by an LOM system.

2. Description of the Related Art

The creation of prototypes in design work has conventionally required a painstaking cutting or forming operation by skilled technicians or artisans, involving considerable time and expense. Multiple tools, and in some cases automated machines, are used in such prototype productions. After the prototype is constructed, inspected, and tested, design changes are the rule rather than the exception. This requires additional time and expense.

In response to the problems of conventional prototype manufacture, many design firms now utilize computer-driven, automated production machines. In these machines, a computer-assisted design system (CAD system) provides an input three-dimensional shape to a forming machine to create the three-dimensional object. If the design requires modifications, another "hard" copy can be created by the computer-controlled system. Many of these systems involve the bonding together of a number of shaped laminations or layers to form the three-dimensional object. These laminated object manufacturing (LOM) systems typically use a laser as a tool for forming each lamination, the laser being controlled by an X,Y plotter device upon commands from a computer with input from the CAD system. Other such LOM systems involve the use of ultraviolet radiation on sequential layers of fluid in a bath, and are generally termed stereolithography devices. Still other LOM systems utilize a powder-based material deposited in layers with selected portions cured using ultraviolet radiation or other source of energy to form the various laminations of the three-dimensional object. Variations on these LOM systems can be found in U.S. Pat. Nos. 4,752,352, 5,015,312, and 5,354,414.

In several of these prior systems, sheets of plastic, paper, or other such substrates are conveyed over a work station and operated on by a forming tool, such as a laser. The individually formed laminations are bonded together using an adhesive which is preapplied to the sheet, or is applied by a separate device within the LOM system. The adhesive is either a pressure-sensitive or heat-sensitive type. A roller is typically applied over the stack of laminations between each successive lamination forming step to bond the laminations together. If heat is applied, this roller is termed a fuser. The system must keep track of the height of the stack of laminations so that the proper force is applied by the roller. In addition, excessive amounts of heat applied to the laminations may result in warpage or other unwanted dimensional variations.

Another problem with conventional LOM systems is maintaining a precise registry between the stack of laminations and the X-Y plotter device holding the forming tool. Tolerance and assembly problems can cause misalignment between the X-Y plotter device and the roller or fuser, and between the X-Y plotter device and the forming tool.

Another problem often encountered is the tendency for wrinkles to develop in the various layers just prior to bonding, thus creating discontinuities in the layer thicknesses and bonding of the wrinkles in the part. The wrinkles occur when the tension across the sheet to be bonded is uneven because the wind-up roll pulls the portion of the sheet which has large voids along the centerline from previously cut out layers. The tension is thus transmitted along the sides of the sheet, rather than evenly thereacross.

As a consequence, there is a need for an improved LOM system which overcomes the drawbacks of prior systems.

SUMMARY OF THE INVENTION

The present invention provides a laminated object manufacturing system for converting sheet material into a three-dimensional object comprised of a plurality of layers of the sheet material. The system includes a base frame and a reference frame on the base frame. The reference frame comprises at least one reference frame member having first and second rail portions disposed on a common support structure portion. A work station in the system is adapted to position the sheet material relative to the reference frame. A forming tool is movably mounted on the first rail portion and driven to move relative to the work station so as to form the layers from the sheet material. A bonding tool is movably mounted on the second rail portion and driven to move relative to the work station so as to bond adjacent layers of the sheet material to each other. Finally, a controller electronically controls the movements of the forming tool and the bonding tool. In one embodiment, the support structure portion comprises a first beam and the system additionally comprises a second reference frame having first and second rail portions disposed on a common second beam. The first and second beams may be mounted on opposite sides of the work station, wherein the forming tool is mounted on the first rail portions of the first and second beams, and the bonding tool is mounted on the second rail portions of the first and second beams. Additionally, the work station may be mounted to move with respect to the reference frame.

In accordance with another aspect of the present invention, a laminated object manufacturing system is provided for converting sheet material into a three-dimensional object comprised of a plurality of layers of the sheet material. The system comprises a base frame, a reference frame on the base frame, the reference frame defined by at least one reference frame member, a work station mounted to position the sheet material, a forming tool including an X-Y plotter mounted on the reference frame member, a laser mounted on the reference frame member for producing a laser beam, and at least one mirror mounted on the reference frame member to receive the laser beam and direct the beam onto the sheet material.

In another embodiment, the invention encompasses a laminated object manufacturing system for converting sheet material into a three-dimensional object comprised of a plurality of layers of the sheet material. The system includes a work station adapted to position the sheet of material, a forming tool mounted to remove relative to the work station to form the layers from the sheet material, and a bonding tool mounted to move relative to the work station to apply force and bond adjacent layers of sheet material to each other. A sensor is mounted to sense the force applied by the bonding tool to the sheet material during bonding of the adjacent layers, and a controller electronically controls the position of the bonding tool with respect to the work station in accordance with the force sensed by the sensor.

In still another form, the present invention embodies a laminated object manufacturing system for converting sheet material into a three-dimensional object comprised of a plurality of layers of the sheet material, comprising a work station adapted to position the sheet material, a forming tool mounted to move relative to the work station to form the layers from the sheet material, and a bonding tool mounted to move relative to the work station to bond adjacent layers of sheet material to each other. A temperature sensor is mounted to sense the temperature of an exposed layer of sheet material that has been bonded to other layers, and a controller controls the speed of the bonding tool relative to the work station in accordance with the temperature sensed by the temperature sensor.

DETAILED DESCRIPTION OF THE PREFERRED EMBODIMENTS

Figure 1:
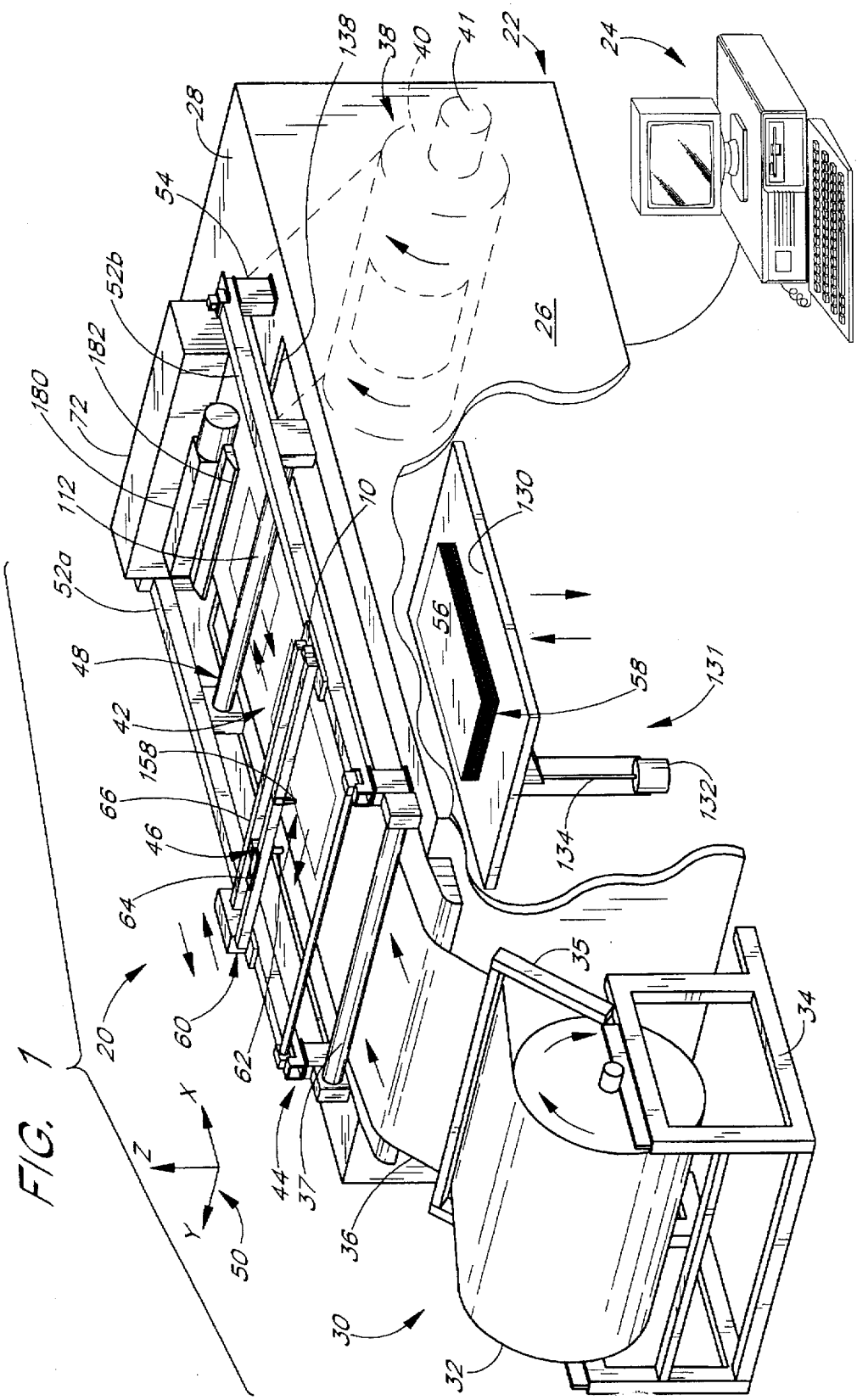
FIG. 1 is a schematic perspective view of an improved LOM system of the present invention.

As seen in the drawings, the preferred embodiment of the present invention provides a laminated object manufacturing (LOM) system 20 for forming a plurality of layers into a three-dimensional object. The preferred embodiment utilizes a continuous sheet of material fed from a roll to provide layers for forming the three-dimensional object, however, it will be understood that certain features described herein may be applicable to other types of LOM systems. By way of example (and not limitation), many features of the preferred embodiment may be useful in LOM embodiments disclosed in U.S. Pat. Nos. 4,752,352 and 5,354,414, which are expressly incorporated herein by reference.

With reference to FIG. 1, which schematically illustrates the present LOM system 20, a base frame 22 comprises a large, generally rectangular structure on or in which a majority of the components of the system are mounted. The base frame 22 is conventionally formed by rigid metal bracing desirably encompassed by sheet panel siding, and normally is firmly mounted to the floor, but may also be constructed to a smaller scale and be only temporarily held with respect to a table or other foundation. The system is controlled by a computer 24 which may be mounted on the base frame 22, but is typically provided as a stand-alone item and is designed and connected to provide input to and receive and process feedback from the system. The base frame 22 has an elongated front side 26 and a generally horizontal top surface 28.

A feed station 30 is positioned adjacent a left end of the frame 22, although it may also be positioned within the frame 22, as will be described below with respect to FIGS. 8a and 8b. The feed station 30 comprises a feed roll 32 rotatably mounted on a stand 34, the stand having a tensioning bar 35 pivotally mounted thereto. The feed roll 32 dispenses a continuous sheet 36 of material across the top surface 28 of the base frame 22 to a wind-up station 38 mounted within the base frame 22. The tensioning bar 35 fails by gravity onto the top surface of the sheet 36 and provides a smoothing tension across the sheet 36 to ensure flatness across the top surface 28 of the system. The wind-up station 38 is schematically shown in dashed lines and typically includes a wind-up roll 40 rotated by a motor. The wind-up station 38 thus pulls the sheet 36 of material over the top surface 28 of the base frame 22 in a left-to-right direction, or positive X-direction, as seen in FIG. 1. A pinch roller 37 is positioned at a left end of the top surface 28 and extends in the Y direction across the width of the sheet 36. The pinch roller 37 includes the upper roller shown, and a lower roller recessed within the top surface 28. The upper and lower pinch rollers combine to help propel the sheet 36 across the top surface. That is, both the upper and lower pinch rollers 37 are motor driven and come into close contact to pinch the sheet 36 therebetween. As will be described below, the pinch rollers may be positioned on a right end of the top surface 28 to pull the sheet 36, but are preferably positioned on a left end to push the sheet across the top surface 28.

The sheet 36 extends across a work station 42, generally defined in the center of the top surface 28 of the base frame 22. A reference frame 44 is mounted adjacent the work station 42 to position a forming tool 46 and bonding tool 48 thereover. The reference frame 44 defines a reference frame coordinate system 50, indicated on FIG. 1, and preferably comprises a pair of elongated reference frame members 52a, 52b mounted over the top surface 28 of the base frame 22 on a plurality of legs 54. The reference frame members 52a, b comprise rigid beams which support and provide linear guide rails for both the forming tool 46 and bonding tool 48. The system 20 desirably comprises a cover, not shown for clarity, adapted to enclose the feed, forming and bonding components on the top surface 28. Preferably, the cover is a hollow rectangular housing pivotably mounted along a horizontal axis at a rear corner of the top surface 28. The cover further includes windows for viewing the forming and bonding operations within. The cover protects the system components and helps to contain smoke and other particulates generated by the forming tool, as will be mentioned below.

As will be described in greater detail below, the forming tool 46 and bonding tool 48 work in conjunction to create a plurality of layers 56 to form a stack 58 of layers, which is subsequently processed into the resulting three-dimensional object. It is very important that the forming tool 46 and bonding tool 48 move in parallel relative to the work station 42 to avoid quality problems with the resulting three-dimensional object. Although the reference frame coordinate system 50 is preferably oriented with respect to the base frame 22 so that, for example, the X axis extends in parallel to the intersection between the planar front face 26 and top surface 28 of the base frame, some misalignment between the coordinate systems of the reference frame 44 and that of the base frame may be introduced during manufacturing or assembly of the LOM system 20. Therefore, a key aspect of the present invention is the positioning of both the forming tool 46 and the bonding tool 48 on a common reference frame member 52. In the presently illustrated embodiment, both the forming tool 46 and bonding tool 48 are mounted at each respective end to one of two common reference frame members 52a,b, but it will be appreciated by one of skill in the art that the forming and bonding tools may be mounted to a single frame member suitably designed to provide proper tool support.

The forming tool 46 preferably comprises an X-Y positioner, or plotter, 60 having a focusing lens 62 positioned on a Y-axis carriage 64. The carriage 64 is adapted to translate in the Y-axis along one or more lateral supports 66 mounted at each end on X-axis carriages 70. The X-axis carriages 70 are, in turn, adapted to translate linearly along the X-axis on the reference frame members 52a,b. In this manner, the focusing lens 62 may be positioned in the X-Y plane above the work station 42. The forming tool 46 further comprises a laser 72 mounted on the reference frame 44 at the right end thereof. In a preferred embodiment, the laser 72 is rigidly mounted at the right end portions of the reference frame members 52a,b. In this manner, the laser 72 is positioned within the reference frame coordinate system 50, as opposed to the base frame coordinate system.

Figure 2:
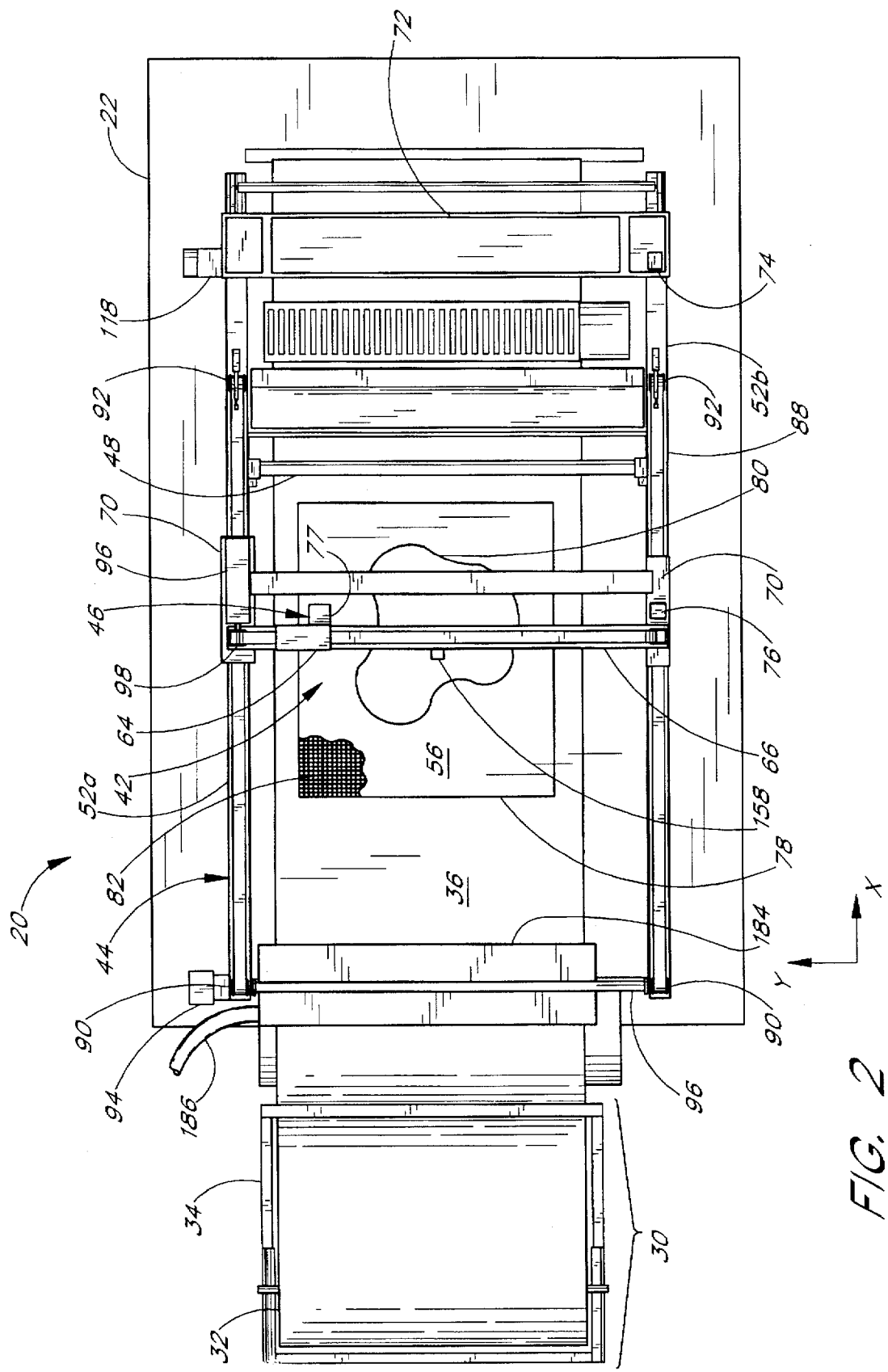
FIG. 2 is a top plan view of the system of FIG. 1.

As seen best in FIG. 2, the laser 72 is capable of generating a beam of laser light out of one end, in this case the lower end, which reflects off a first mirror 74 and is directed 90° to the left. A second mirror 76 mounted on one of the X-axis carriages 70 then directs the laser light 90° upward to continue along the Y axis and reflect off of a mirror 77 provided above the lens 46. The beam of laser light is then directed downward by the mirror 77 through the lens 46 toward the work station 42. The specific system of mirrors may be altered based on geometric or other considerations, and such variations are within the skill of one knowledgeable in optic systems.

The type of forming tool 48 used in the LOM system preferably comprises a CW carbon dioxide laser with an output of between about 25 and 400 W, and desirably about 50 W, at a wavelength of 10.6 microns. Lasers of different wavelength with continuous wave or pulse characteristics, beams of high energy particles, microwave energy, and heat generated by electrical current, are contemplated. These energy sources will usually be concentrated on the surface of the sheet material 36 by a device, such as the focusing lens 62, mounted on the Y-axis carriage 64 of the X-Y plotter 60. Indeed, the present embodiment discloses the use of a laser 72 in conjunction with a series of mirrors and the lens 62, the laser beam being suitable focused on the sheet material 36 so as to cut lines through the material to a depth of at least one thickness of the sheet. Various other types of forming tools may not require the separately mounted laser and system of mirrors, but may be incorporated completely within the Y-axis carriage 64. For example, a mechanical cutting knife may be provided on the Y-axis carriage 64.

FIG. 2 illustrates a particular layer 56 having been cut from the sheet material 36. In this generalized example, a rectangular cut line 78 defines the layer 56. A particular contour line 80 is created by the forming tool 46, upon manipulation of the lens 62 by the X-Y plotter under commands from the controlling computer 24. The material inside of the contour line 80 is intended to form a single layer of the three-dimensional object. The material outside of the line 80 is typically scrap, and is removed in various methods. Alternatively, of course, the material inside the line 80 may be scrap and the material outside is then the desired layer of the final 3-D object. In one method of removing unwanted material, as indicated in the corner of the sheet 56, cross-hatching 82 is cut in the sheet 56 so that the resulting three-dimensional object will have a volume of loosely bound material around its exterior created by layers of cross-hatched material. The loosely bound material can then be knocked or scraped off, leaving the desired contour layer within. Of course, other methods of removing the unwanted material outside of the cut line 80 are possible, such as those described in U.S. Pat. Nos. 4,752,352 and 5,354,414.

Figure 3:
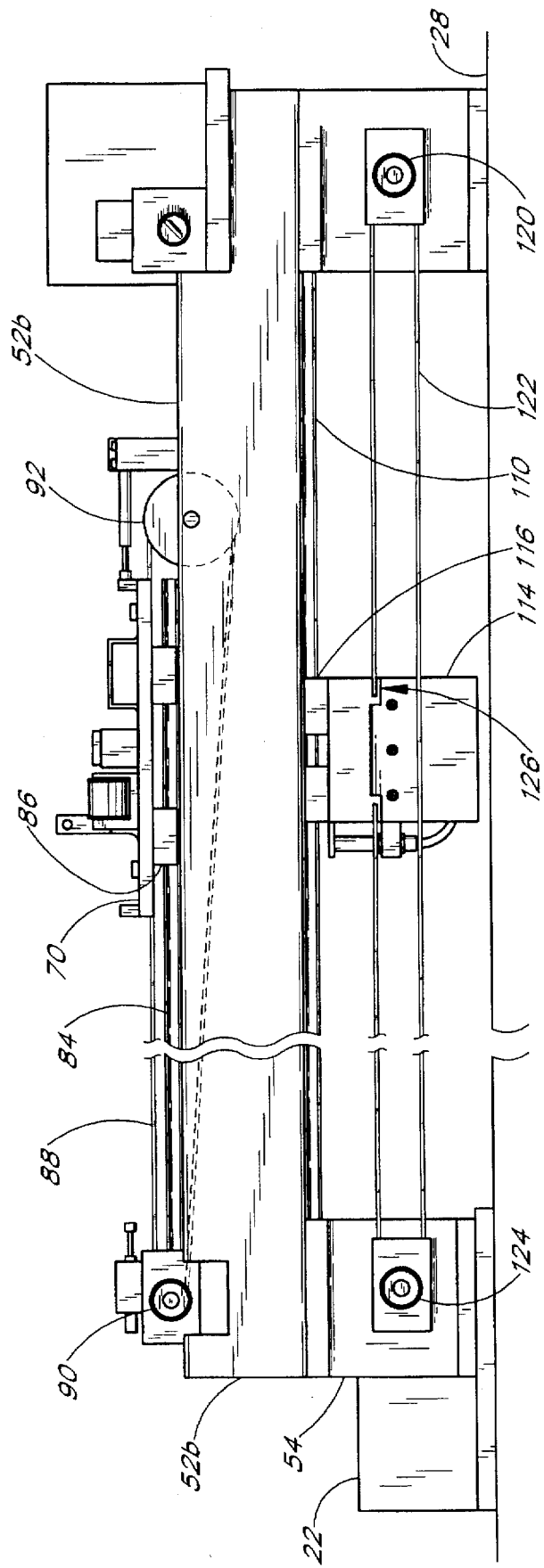
FIG. 3 is a front elevational view of the system of FIG. 1.
Figures 4A, 4B:
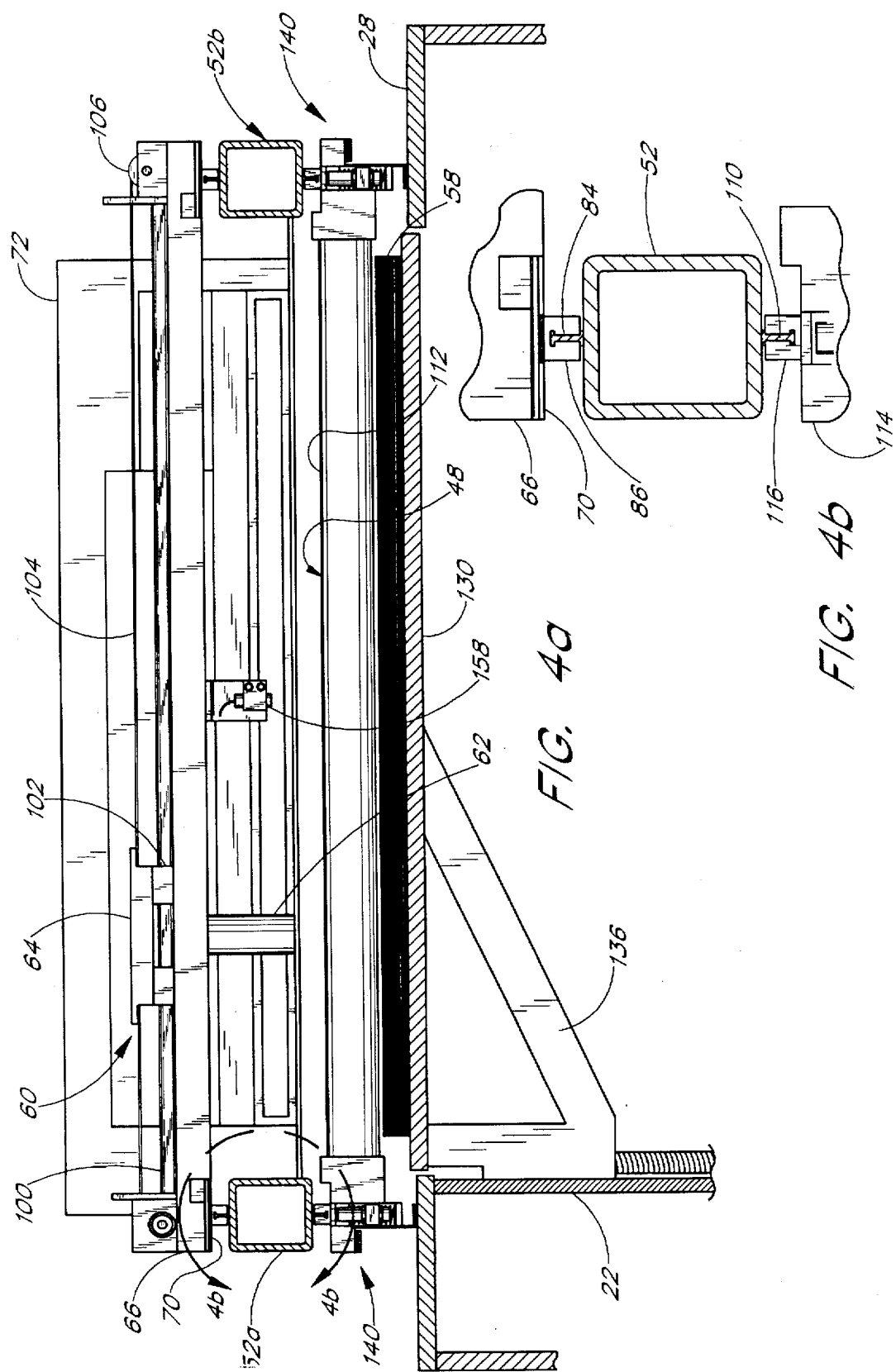
FIG. 4 is an end elevational view of the system of FIG. 1.

The X-Y plotter is indicated schematically in FIG. 1, and may be implemented in a number of ways. In one particular embodiment, as seen in FIGS. 2–4, the X-Y plotter comprises the aforementioned carriages 64 and 70 which are belt driven and ride on linear rails. More particularly, the X-axis carriages 70 are adapted to slide linearly along an upper rail portion 84 provided on the reference frame members 52a,b. The rail portion 84 is seen in side view in FIG. 3 with the X direction carriage 70 shown mounted on a pair of linear bearings 86. The rail portion 84 is provided on the upper surface of the reference frame members 52, and is seen in greater detail in FIGS. 4 and 4a. The linear bearings 86 are desirably of a type manufactured by Star or Thompson. On the inside of each of the X-axis carriages 70, a clamp mechanism (not shown) attaches the carriages to two ends of a belt 88 to form a continuous loop. The belt 88 is preferably toothed on an interior surface and extends around a toothed drive pulley 90 on a left end of the reference frame member 52, and a toothed idle pulley 92 on a right end of the reference frame member. The belt 88 and pulleys 90 and 92 are toothed to ensure nonslip displacement of the X-axis carriages 70, thus allowing precise information regarding the dynamic position of the carriages to be determined based on a knowledge of an initial carriage position and subsequent rotation of the pulley shafts or associated motors.

The pulleys 90 and 92 may be journaled about bearings formed directly in the reference frame member 52, or, as in the case of the drive pulley 90, are journaled about a bearing formed in a rigid member fastened to the reference frame member. A shown, the drive pulley 90 is somewhat smaller than the idle pulley 92 and the belt 88 extends at a slope within a hollow space created by the reference frame member 52, as indicated in phantom in FIG. 3. This arrangement is not critical and the pulleys 90, 92 may be identically sized. The pulleys 90 and 92 are positioned such that their uppermost points of tangency are at the same height so that the belt 88 extends horizontally therebetween. As seen in FIG. 2, a drive motor 94 is keyed to rotate the drive pulley 90 provided on the uppermost reference frame member 52a. An elongated shaft 96 extends between the drive pulleys 90 of the upper and lower reference frame members 52a and 52b to couple their rotation. The belts 88 thus move in synchronism with the rotation of the motor 94, which is, in turn, controlled by the computer 24.

A drive motor 96 mounted to the upper X-axis carriage 70 drives a pulley 98 mounted for rotation on the Y-axis carriage 64, or on or within the lateral support 66 on which the carriage translates. In this respect, the support 66 includes a rail 100 (seen in FIG. 4) on which the carriage 64 rides on one or more linear bearings 102. The carriage 64 is fastened to two ends of a belt 104 which extends around the drive pulley 98, and an idle pulley 106 mounted for rotation on the opposite end of the lateral support 66. The coupling of the belt 104 to the carriage thus creates a continuous loop. The upper segment of the belt 104 extends horizontally between the pulleys 98 and 106 and is clamped to both lateral sides of the Y-axis carriage 64. The motor 96 is controlled by the computer 24.

Upon Y-axis motion of the carriage 64 driven by the belt 104, and X-axis motion of the carriages 70 driven by the belt 88, the forming tool 46 can be positioned over the work station 42 to form the various lines 78 and 80, and cross-hatching 82, in the sheet material 36. Of course, as mentioned previously, other variations of an X-Y plotter are possible. For example, the carriages might be provided with internally threaded nuts which ride on rotatable lead screws in place of the belt drive arrangement. Additionally, the rotation of the drive pulleys 90 are coupled by the shaft 96, but their rotation may be independent using two motors, such as motor 94, which run synchronously.

The bonding tool 48 is also mounted for translation in the X direction on the underside of the reference frame members 52a,b. More specifically, as seen in FIG. 3, each of the reference frame members 52 includes a lower rail portion 110 affixed on an underside thereof. The rail portion 110 extends substantially the length of the reference frame members 52, and is seen in greater detail in FIGS. 4 and 4a. Each of the reference frame members 52a,b, thus comprises a structural support portion and a pair of rail portions. In a preferred embodiment, as seen in the detailed view of FIG. 4a, the structural support portion comprises a square channel beam having upper and lower parallel flat surfaces on which the rail portions are mounted. The rail portions may be formed integrally with the beam, but are preferably affixed thereto. The rail portions typically comprise precision machine steel I-beam shaped elements each having one flange fastened to the reference frame member and the web extending therefrom. The outer flange serves to retain the linear bearings on the rail portions.

The bonding tool 48 comprises a roller or fuser 112 mounted on both ends for rotation in carriages 114. As seen in FIG. 3, a pair of linear bearings 116 is provided on each carriage 114 for linear translation along the lower rail portion 110 of the associated reference frame member 52a,b. The fuser 112 is thus adapted to move in the X-direction underneath the X-Y plotter 60 with clearance between the fuser and the lens 62, as seen in FIG. 4. FIG. 2 illustrates a drive motor 118 for the bonding tool 48 mounted at a right end of the upper reference frame member 52a. The motor 118 rotates a drive pulley (not shown) which is keyed to a shaft extending laterally in the Y-direction across the reference frame 44 to drive a pulley 120 (FIG. 3) mounted for rotation underneath the lower reference frame member 52b. The drive pulley 120, in turn, drives a belt 122 extending in the X-direction around an idle pulley 124. In a similar manner, the drive pulley not shown on the upper reference frame member 52a rotates a belt wrapped around an idle pulley underneath the left end of the reference frame member 52a. Each of the belts 122 attaches to the respective X direction carriage 114 of the bonding tool 48 using a clamping mechanism and fasteners, as generally shown at 126 in FIG. 3. The clamping mechanism fasteners shown at 126 are typical throughout the present system 20, and may be utilized for coupling the respective belts to the Y-axis carriage 64 and X-axis carriages 70 of the X-Y plotter 60. The use of a shaft across the reference frame 44 ensures that the motion of the carriages 114 on either end of the bonding tool 48 is synchronized. Again, the rotation of the motor 118 is controlled by the computer 24.

With reference again to FIG. 1, the stack 58 of layers 56 is positioned on a work table 130 vertically movable in the Z axis using an elevator mechanism 131 driven by a motor 132. More specifically, the motor 132 may rotate a threaded shaft 134 which extends through a threaded coupling (not shown) fixed with respect to the work table 130. Alternately, the motor 132 may be fixed with respect to the table 130, and have a female threaded coupling as an output which rides a fixed threaded shaft. In a preferred embodiment, there is a single motor and threaded shaft, rather than multiple motors and shafts to ensure proper Z axis alignment of the work table 130.

With reference to FIG. 4, the work table 130 is supported by a relatively sturdy angle bracket support frame 136 under one end thereof. The support frame 136 is sturdy enough, and the table 130 is thick enough, so that the upper surface of the table 130 remains horizonal at all times. The stack 58 is, thus, positionable in parallel with respect to the top surface 28 of the base frame 22. In this respect, a large rectangular aperture 138 is provided in the center of the top surface 28 through which the work table 130 may be accessed by the forming tool 46 and the bonding tool 48. The work table 130 provides a support surface for the various layers 56 formed by the forming tool 46 and, thus defines the work station 42. The sequence of operation will be described further below.

In one step of the forming sequence, the bonding tool 46 translates across the work station 42 to apply force and/or heat to the upper layer 56 of the stack 58. The sheet material 36 may have a layer of pressure- or heat-sensitive adhesive on an underside thereof. If the adhesive is pressure-sensitive, the working portion 112 of the bonding tool 48 is termed a roller, and if the adhesive is heat-sensitive, a fuser. Here, the term fuser will be used to indicate both types. The force applied to the stack 58 must be carefully controlled to ensure proper bonding of the layers 56. The bonding tool 48 is mounted at a generally constant elevation with respect to the reference frame 44 and, thus, the interference between the height of the top layer 56 of the stack 58 and the fuser 112 is determined by the height of the work table 130.

Figure 5:
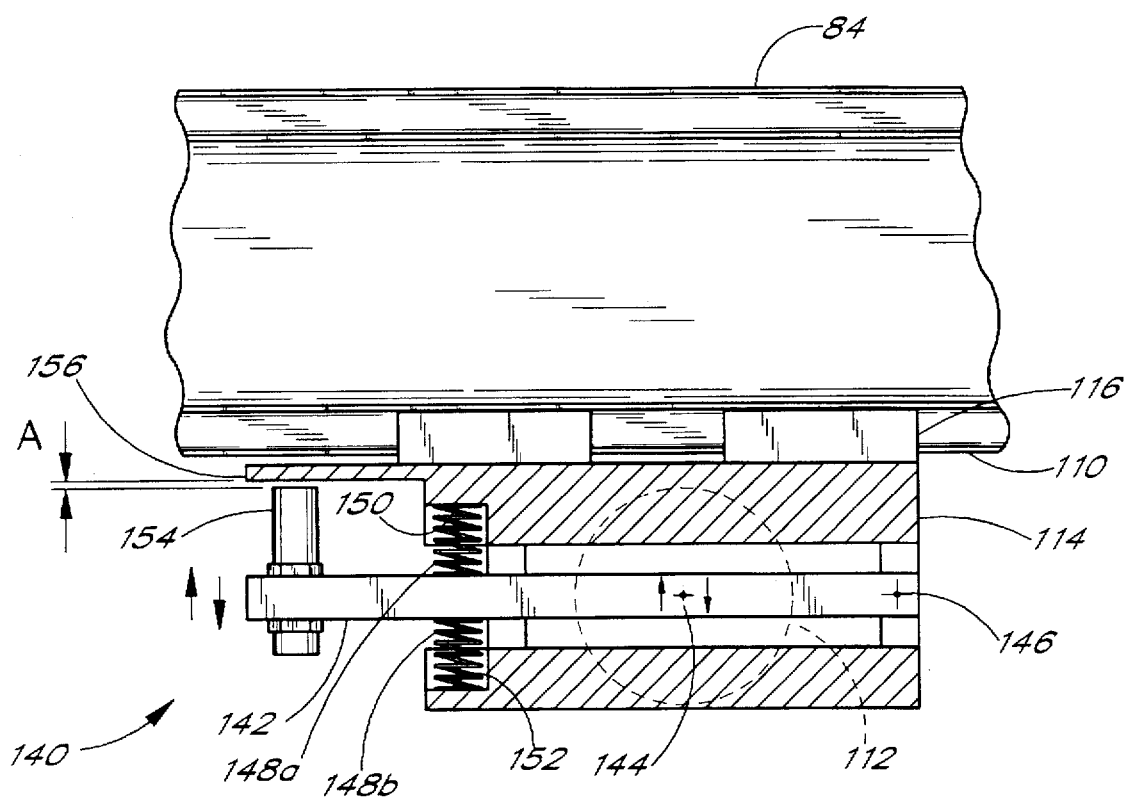
FIG. 5 is a detailed view of a force sensing mechanism on the end of a fuser in the system of FIG. 1.

To ensure proper force between the fuser 112 and the upper layer 56 of the stack 58, a force sensing system 140 is provided. More specifically, as seen in FIG. 5, both ends of the fuser 112 are journaled for rotation within bearing blocks 142. The center of rotation of the fuser 112 is indicated at 144 in FIG. 5. The bearing blocks 142 are, in turn, mounted for pivoting motion about a point 146 fixed with respect to the X direction carriage 114. The bearing blocks 142, thus, provide essentially a moment arm about the point 146. A pair of springs 148a, 148b maintain an equilibrium position of the bearing block 142 with respect to the carriage 114. More specifically, the upper spring 148a is mounted to provide a biasing force between an upper surface of the bearing block 142 and a downwardly-facing surface 150 of the carriage 114, and the lower spring 148b is positioned to provide a bias between the lower surface of the bearing block 142 and an upwardly-facing surface 152 of the carriage 114. The fuser 112 is mounted for rotation at the point 144 having its axis extending through the bearing block 142 between the line of force of the springs 148a, b and the pivot point 146. A position sensor 154 is provided at a point at the other side of the axis 144 of fuser rotation from the springs 148a, b. The position sensor 154 faces an extending portion 156 of the carriage 114 and is positioned a distance A from the extension 156. The distance A changes when the bearing block 142 rotates about the pivot point 146.

Normally, the springs 148a and 148b maintain a constance distance A between the position sensor 154 and extension 156. Upon force being applied to the fuser 112, the bearing block 142 may pivot slightly against the action of one or both of the springs 148a or 148b to alter the distance A. In normal operation, the fuser 112 is biased slightly upward upon contact with the upper layer 56 of the stack 58. Using the spring constant of the springs 148a and 148b, and the distance sensed by the position sensor 154, the force applied to the moment arm defined by the bearing blocks 142 can be obtained, this force also being related to the distance from the pivot point 146 of the center 144 of the fuser 112. A mathematical calculation by the computer 24 then determines the force applied to the fuser 112 by the stack 58. The systems 140 are calibrated to convert a linear distance into a force based on the spring rates and particular geometry. It should be noted, however, that a direct force measurement may be taken at either end of the fuser 112, with a load cell, for example. In this respect, the ends of the fuser 112 may be mounted at a fixed height with respect to the carriages 114 with a load cell therebetween. The spring mounting is less expensive and allows for high resolution due to the long moment arm on which the fuser is mounted.

The fuser 112 applies essentially a line force to the stack 58 along a lower generatrix. The sensing mechanisms 140 together provide information to solve for a force per linear inch applied by the roller 112. If the proximity sensor 154 senses that the bearing block 142 has been pivoted too great of a distance, indicating greater than a threshold force being applied by the fuser 112, the computer 24 processes this feedback information and instructs the motor 132 to lower the work table 130 a slight amount. When the distance A reaches its equilibrium value again, the motor 132 stops, thus, stopping the downward motion of the table 130.

The force sensing system 140 represents a significant improvement in two respects over prior mechanisms for determining the relative height difference between the top of the stack 58 and the bonding tool 48. First, measurement of the force as opposed to a proximity switch reduces inaccuracies associated with uneven surfaces. More specifically, a proximity switch may read the top surface of a layer incorrectly because a discontinuity in that top surface deviates from the remainder of the surface. The portion which is read may only represent a bump or other weakness in the top surface which is incapable of supporting the roller. When the roller passes over the top surface, therefore, the discontinuity is smoothed out the contact between the roller and the top surface of the stack is insufficient. Secondly, the force sensing system 140 senses the force at multiple locations across the stack to obtain an average force. In the preferred embodiment, there are two such sensors mounted at either end of the fuser 112. In other embodiments, however, more than two sensors may be mounted along the fuser. The multiple sensing devices thus produces an average force between the fuser 112 and the stack 58, which is more accurate than measuring at a single point. Furthermore, the output from the two or more sensors may be monitored to determine if the stack 58 becomes tilted in a lateral direction. That is, if the force on one end of the fuser is significantly greater than that at the other end, then the stack 58 may be out of alignment with respect to the fuser 112. Such a condition will be relayed to the computer 24 which may decide to stop the operation of the system 20.

FIGS. 1 and 2 illustrate a temperature sensor 158 mounted at a central location along the support 66 over the work station 42. The temperature sensor 158 is adapted to sense the temperature of the exposed layer 56 of the stack 58 which is a concern when using heat sensitive adhesives to bond the layers. Preferably the sensor 158 is an infrared temperature sensor connected to indicate the temperature of the layer 56 to the computer 24. Knowledge of the temperature of the upper layer 56 helps the system 20 improve the bonding process of the stack 58. More specifically, too great a temperature provided by the bonding tool 48 on the upper layer 56 may cause the layer to expand or swell, thus possibly creating discontinuities in the thickness of the resulting layers in the stack 58. On the other hand, insufficient heat applied by the bonding tool 48 will result in delamination of the stack 58.

The amount of heat applied the stack 58 is determined by a number of variables, including the speed of the bonding tool 48 across the stack, the temperature of the bonding tool, and the force applied by the bonding tool to the stack. In the present embodiment, the force per linear inch between the bonding tool and the stack is constant. To control the temperature of the top layer 56 within an optimum range, the present system 20 manipulates the speed of the bonding tool 48, and, in some instances, the temperature of the bonding tool.

The computer 24 generally reads the output from the temperature sensor 158 and performs a calculation based on the actual and desired temperatures to produce a control signal for the motor 118 which moves the bonding tool 48 across the stack 58. Again, the speed of the bonding tool 48 determines how much energy is delivered to the layer 56 and, thus, determines its subsequent bonded temperature.

It should be pointed out that the temperature information obtained by the conceptualized sensor 158 may be acquired in several ways. The temperature may be measured at a single point over the layer 56, as a multitude of points as the sensor 158 is scanned across the stack 58, just after bonding to read the peak temperature, just before bonding, or combinations of the above. Additionally, several control methods performed by the computer 24 are possible. For example, the motor speed may be determined by the following formula:

$$\text{Motor speed} = M_0 + (T_A - T_D) \times K$$

where:

$M_0$ = initial motor speed;

$T_A$ = actual layer temperature (read at a single point);

$T_D$ = desired temperature; and $K$ = a constant which determines the strength of the control.

Another example of a control method incorporating integration is as follows:

$$\text{Motor speed} = M_L + (T_A - T_D) \times K$$

where:

$M_L$ = last motor speed;

$T_A$ = actual layer temperature (read at a single point);

$T_D$ = desired temperature; and $K$ = a constant which determines the strength of the control.

In the control method incorporating integration, $M_L$, is updated to the current motor speed at the end of each run. This will result in a lower temperature error, but $M_L$ needs to be reset to initial value whenever the process is stopped.

Other control schemes such as PID, feed forward, fuzzy logic, etc., are also applicable and are well known to the those of skill in the art. In addition, in the above discussion K is shown as a constant. Adaptive algorithms may also be used which vary the value of K to obtain the best control.

The foregoing discussion assumes that the heat source, or bonding tool 48, moves with constant speed. However, if the temperature profile of the sheet 56 is measured, the velocity of the bonding tool 48 may be varied to compensate for temperature differences across the layer. This may be done as a continuous function or implemented in zones. In such a scheme, the control functions are as above, but calculated based on position as well as the temperature information.

Furthermore, as the stack 58 is built, its temperature tends to rise since thermal energy is being added to it at a rate faster than it is being removed. The various control methods described above will increase the speed of the heat source, or bonding tool 48, to compensate. This is desired since it results in faster part building. The top speed is, however, limited by physical constraints on the mechanism for translating the bonding tool 48. It may be that the control method results in calculated speeds greater than the hardware is capable of achieving. To resolve this, an additional control regulating the heat of the bonding tool 48 can be added. The speed control system can have an output which signals the temperature controller of the bonding tool 48 to increase or decrease the temperature of the bonding heat source. If the present calculated speed of the bonding tool 48 is nearing its upper limits, the temperature of the fuser 112 will be lowered. If the present calculated speed of the bonding tool 48 is nearing its lower limit, the temperature of the fuser 112 will be increased.

The above-mentioned control methods allow the bonding temperature to be reduced without incurring the risk of delamination. This reduces the layer-to-layer overlap which may cause decubing problems. Overlap is a difference in size between layers which are desirable identical. Decubing is the post-forming step of removing the unwanted material, which is typically cross hatched as shown at 82 in FIG. 2.

In some processes, more than one layer at once may be bonded between steps of forming. A first blank layer is bonded to the stack, and then a second cut layer is applied to the blank layer without the forming step inbetween. The forming tool then cuts through both the cut and blank layer. Problems can arise if the cooling profile of the blank and cut layers differ. That is, heat expands each layer and then when removed, the layers contract. If the blank layer is allowed to cool and contract too long before the cut layer is bonded and cut, the two layers may end up with different shapes from subsequent deferential cooling. The edges of the resulting 3-D object are less smooth as a consequence.

Since the overlap is determined by bonding temperature, the amount of overlap can be set by controlling the temperature. Using the control methods described above, the overlap is made more uniform so that the "cutting layers" (i.e., in double layering there are cutting layers and "blank" layers) line up. If the laser power is increased to cut three layers, decubing will still be easy and the process speed may be increased. The improvements in uniformity resulting from the process control described, coupled with increased laser power, can thus increase building speed if slightly worse surface quality of the resulting 3D object can be tolerated.

Another mode of operation contemplated by the present invention is the elimination of wrinkles by reversing the wind-up roll 40. Once the sheet 36 has been advanced and just before bonding, the wind-up roll 40 is reversed for a very brief period, allowing the sheet under the bonding tool 48 to go slack. This relieves the stresses in the paper and reduces the tendency to wrinkle.

In a preferred mode of operation, the forming tool 46 which produces the laser beam cuts the lines in the sheet material 36 by burning the material. The burning operation produces a substantial amount of smoke which can interfere with the beam delivery optics of the laser tool. The present system 20 provides an air circulation system across the work station 42 for removing unwanted smoke or other particles which might interfere with the operation of the laser 72. As seen in FIG. 1, a blower 180 generates a ribbon of air through a knife duct 182, the air being directed generally horizontally in the negative X direction across the work station 42. Although not shown for clarity in FIG. 1, FIG. 2 illustrates an exhaust duct 184 positioned at the left end of the system 20 adjacent the work station 42. A hose 186 leads to a vacuum source for extracting the smoke or other particulates blown across the work station 42 by the knife duct 182. The knife duct 182 and exhaust duct 184 thus cooperate to ensure a clear optical path from the lens 62 to the sheet material 36.

Figure 6:
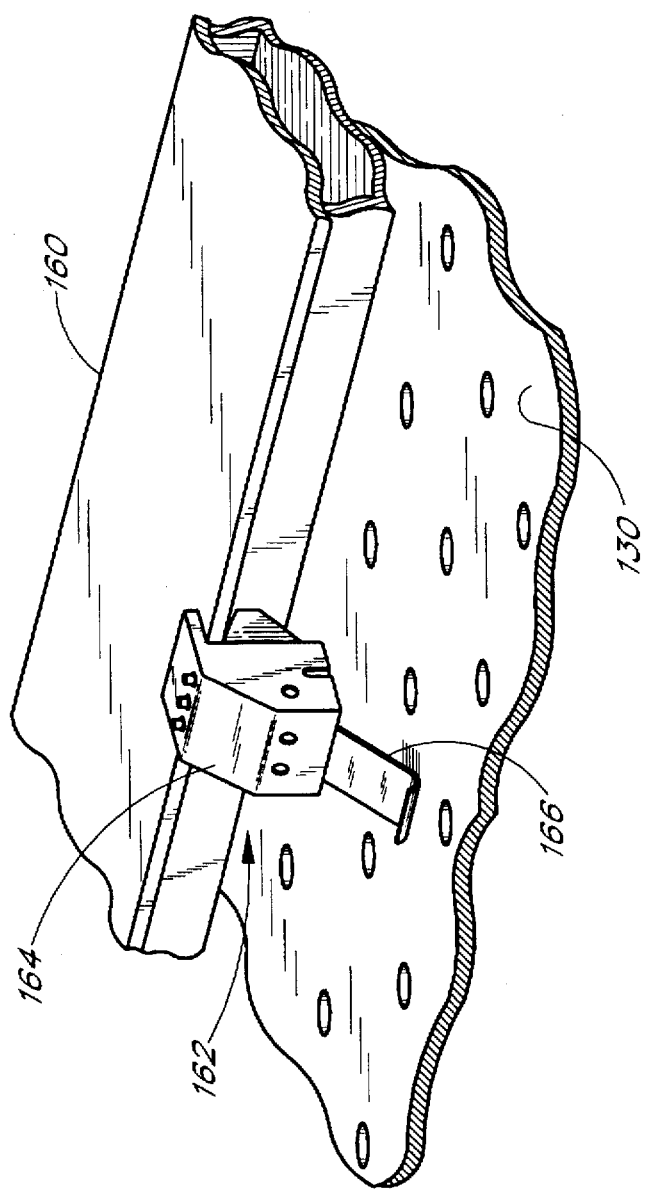
FIG. 6 is a detailed view of an alternative position sensor mounted on the fuser.

FIG. 6 illustrates an alternative position sensor mounted on a fuser support member 160. The position sensor 162 comprises a rigid body 164 having a switch therein mounted to the support member 160, and a downwardly depending curved bar 166. The curved bar 166 is adapted to contact the work table 130, or a stack 58 of layers 56 thereon. In contrast to prior positioning wheels, the curved bar 166 will not register discontinuities in the surface of the stack 58, but instead will provide a more accurate position sensor. When the work table 130 is raised so that the bar 166 is displaced, the switch within the body 164 is actuated indicating that a desired relative position between the work table 130 and the support bar 160 carrying the fuser has been reached. The computer 24 then stops the motion of the work table 130 ensuring proper force applied by the fuser on the stack 58.

Figure 7A:
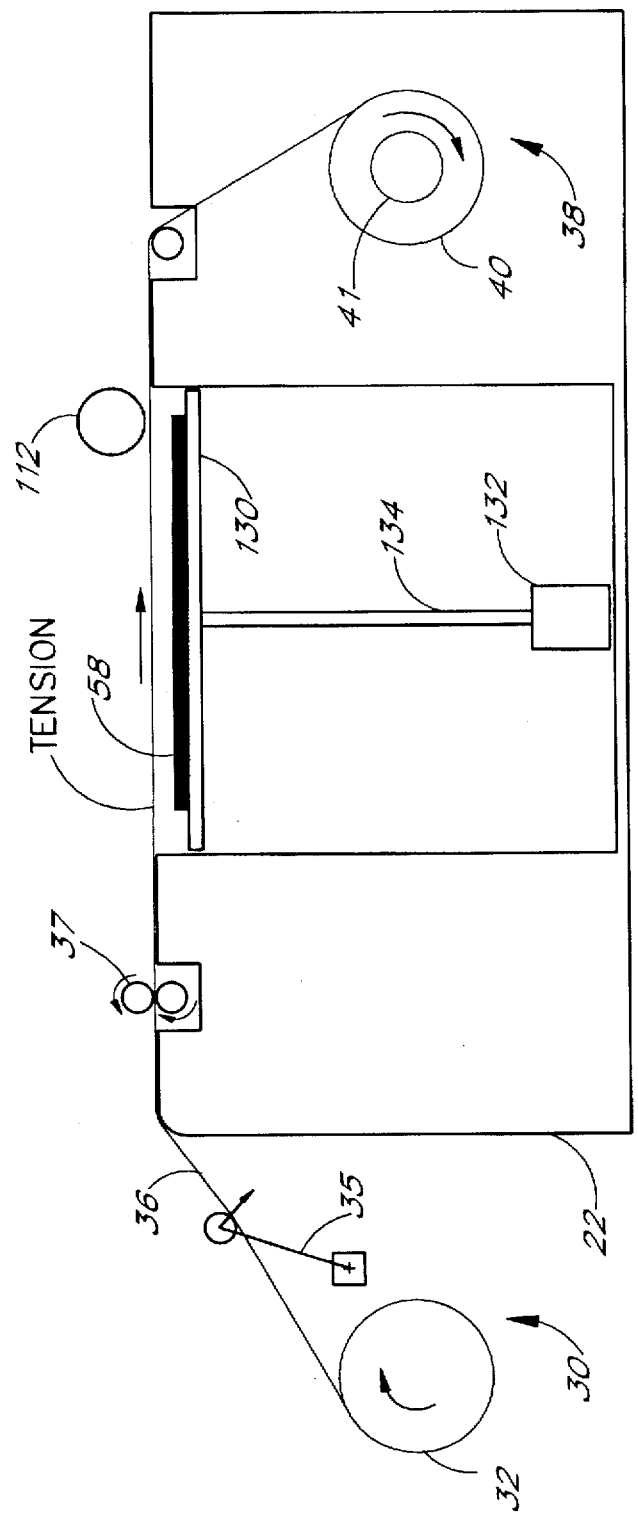
FIG. 7a is a side elevational view of a feed system used in the invention showing a sheet feed stage.
Figure 7B:
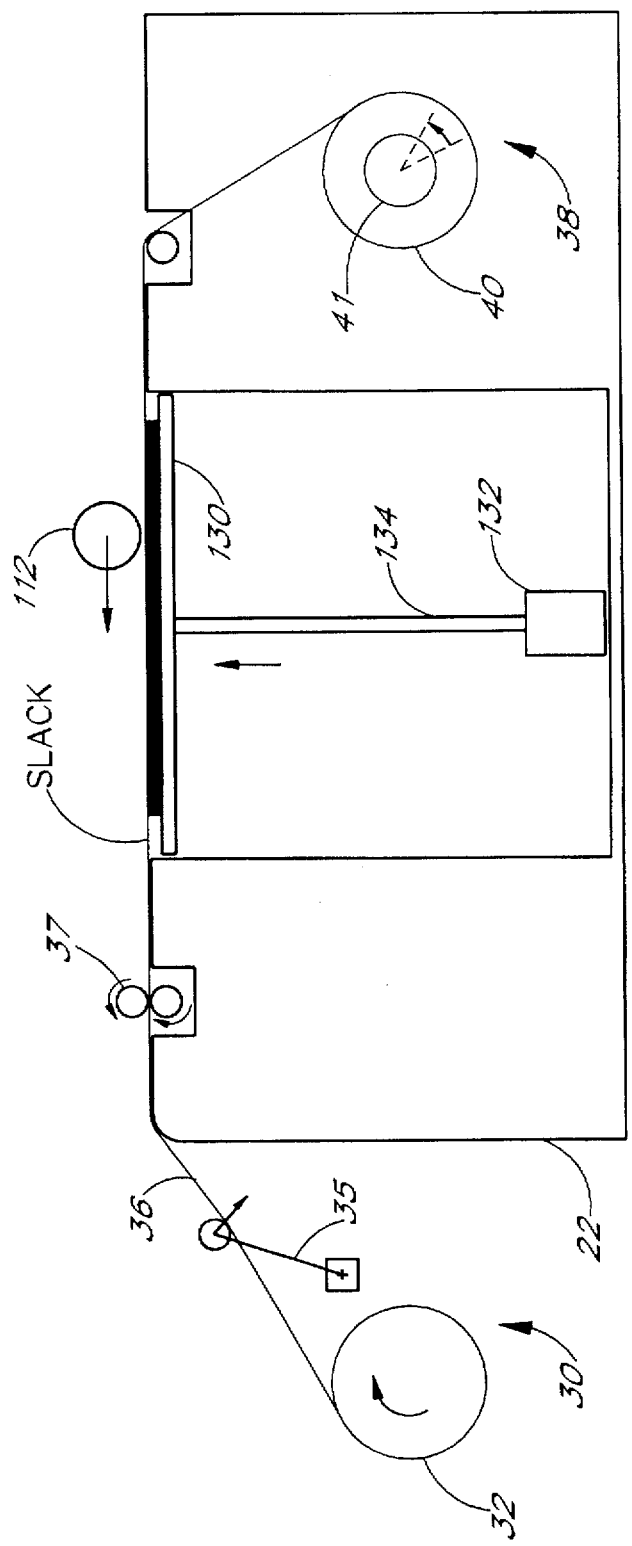
FIG. 7b is a side elevational view of the feed system of FIG. 7a showing a bonding stage.

FIGS. 7a and 7b illustrate one embodiment of a feed system utilized in the present invention. As mentioned previously, the sheet 36 unwinds from a feed station 30, the sheet being tensioned by the bar 35. The sheet 36 passes between the pinch rollers 37 and extends across the top surface 28 of the frame 22 and under the fuser 112. After passing through a slot in the top surface 28, the sheet 36 is collected at the windup station 38 which includes the motor 41 for pulling the sheet 36 across the top surface 28.

FIG. 7a illustrates a stage of operation in which the sheet 36 is being fed across the top surface 28 to expose a new uncut layer over the stack 58. In this respect, the stack 58 has been lowered slightly by the motor 132 and shaft 134. The pinch rollers 37 are shown rotating to push the sheet 36 across the top surface 28. The sheet is indicated as being in tension.

FIG. 7b illustrates a stage of operation in which the table 130 has been raised to position the stack 58 underneath the sheet 36 and the fuser 112 is translated thereacross on the sheet 36 to the stack. Just prior to the fuser 112 moving across the stack 58, the motor 41 reverses by a small amount to provide slack in the sheet 36. This avoids any wrinkling which might otherwise occur in the sheet. At this stage, the pinch rollers 37 are stopped.

As mentioned above, the pinch rolls 37 may be mounted downstream of the work station 42 so that they apply a tensile, pulling force on the sheet material 36. In this arrangement, the reversing of the pinch roll motor(s) can perform the function of the reversible wind-up roll to provide the slack in the sheet. Additionally, pinch rolls may be provided at each end of the work station 42.

Figure 8A:
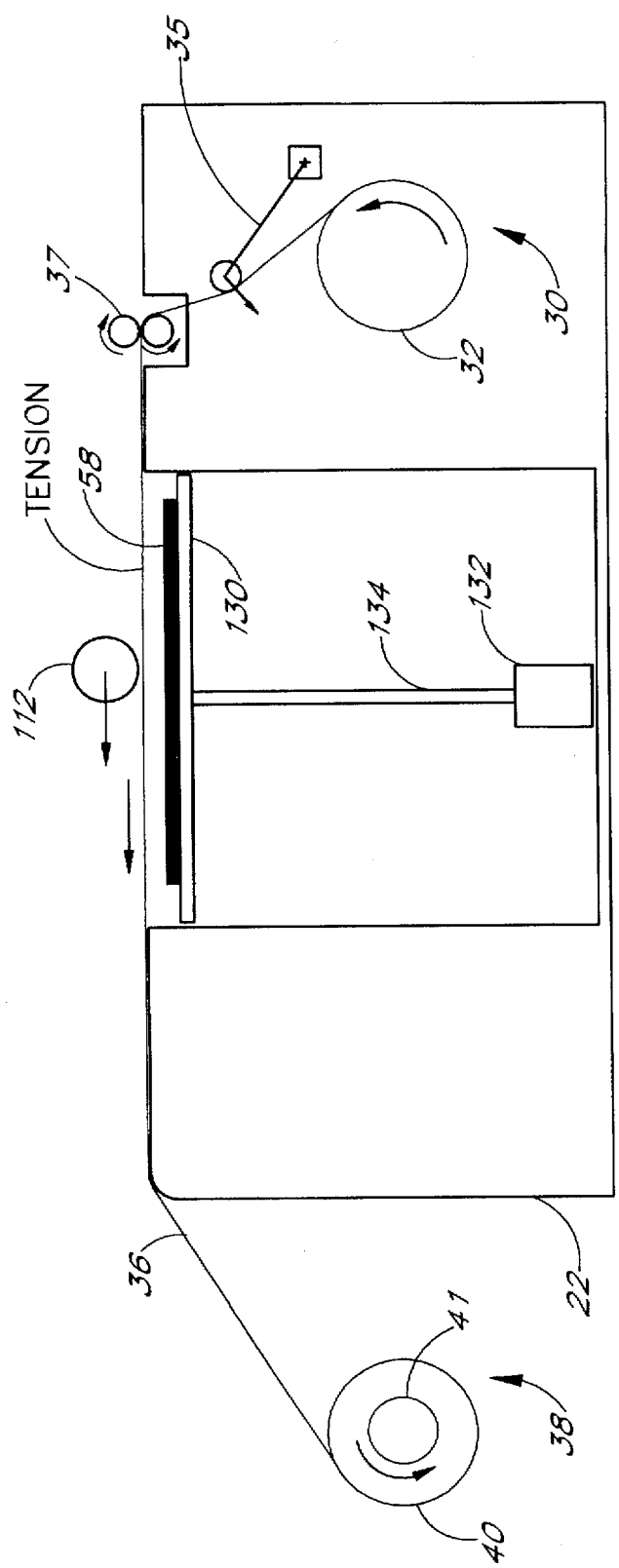
FIG. 8a is a side elevational view of a feed system used in the invention showing a sheet feed stage.

FIG. 8a illustrates a modified embodiment of the feed system of the present invention in which the feed station 30 is mounted within the frame 22, and the windup station 38 is outside the frame. All of the components in this version are the same as those shown in FIGS. 7a and 7b. The mode of operation is slightly different in that the fuser 112 traverses from right to left when the stack 58 is lowered, and the sheet 36 is fed across the top surface 28. The pinch rolls 37 are shown on the right-hand side of the frame 28 pushing the sheet 36.

Figure 8B:
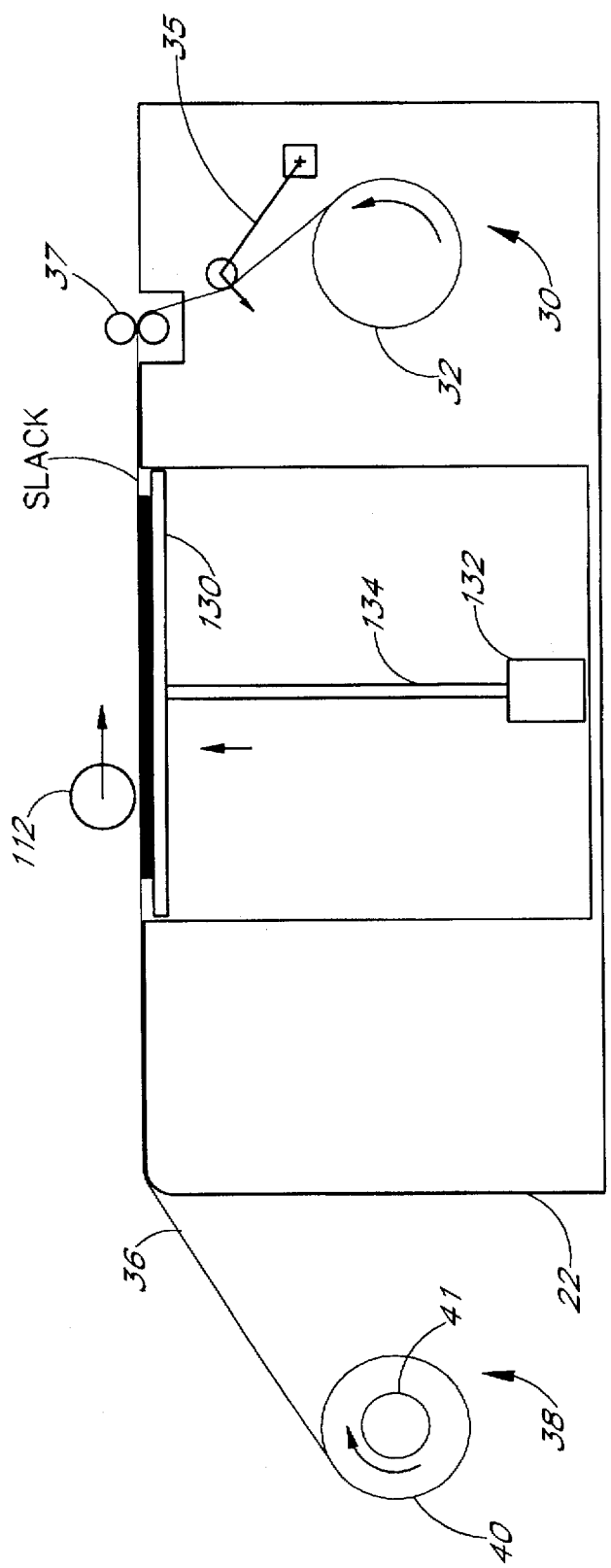
FIG. 8b is a side elevational view of the feed system of FIG. 8a showing a bonding stage.

In FIG. 8b, the stack 58 has been raised on the table 130 into contact with the sheet 36, and the fuser 112 is translated from left to right to bond a layer to the stack. During the bonding process, the sheet 36 is slackened by a slight reverse rotation of the motor 41 to reduce the tendency to wrinkle.

Although this invention has been described in terms of certain preferred embodiments, other embodiments that will be apparent to those of ordinary skill in the art are intended to be within the scope of this invention. Accordingly, the scope of the invention is intended to be defined by the claims that follow.

What is claimed is:

1. A laminated object manufacturing system for converting sheet material into a three-dimensional object comprised of a plurality of layers of said sheet material, comprising:
   a base frame;
   a reference frame on said base frame, the reference frame comprising at least one reference frame member comprised of first and second rail portions disposed on a common support structure portion;
   a work station adapted to position said sheet material relative to said reference frame;
   a forming tool movably mounted on said first rail portion, said forming tool being driven to move relative to said work station so as to form said layers from the sheet material;
   a bonding tool movably mounted on said second rail portion, said bonding tool being driven to move relative to said work station so as to bond adjacent layers of said sheet material to each other; and
   a controller which electronically controls the movements of said forming tool and said bonding tool.

2. The system of claim 1, wherein said reference frame comprises two reference frame members.

3. The system of claim 2, wherein the work station defines a horizontal work surface, and the two reference frame members are mounted on the base frame in parallel adjacent the work surface, the forming tool and bonding tool being movably mounted on the first and second rail portions, respectively, of both reference frame members.

4. The system of claim 1, wherein said support structure portion comprises a first beam and wherein the system additionally comprises a second reference frame member having first and second rail portions disposed on a common second beam, said first and second beams being mounted on opposite sides of said work station, wherein said forming tool is mounted on the first rail portions of said first and second beams, and said bonding tool is mounted on the second rail portions of said first and second beams.

5. The system of claim 1, wherein said work station is mounted to move with respect to said reference frame.

6. The system of claim 5, wherein the work station comprises a work table mounted on an elevator mechanism enabling vertical positioning of the work table with respect to the reference frame, and wherein the forming tool and bonding tool are movably mounted in an X-Y plane perpendicular to the vertical axis.

7. The system of claim 1, further including a sheet material feed system for providing a continuous web of sheet material across the work station, wherein the reference frame is mounted above the work station so that the forming tool and the bonding tool translate over the sheet material.

8. The system of claim 1, further comprising:
   an X-Y plotter mounted on said reference frame member and defining a portion of said forming tool;
   a laser mounted on said reference frame member for producing a laser beam; and
   at least one mirror mounted on said reference frame member to receive said laser beam and direct the beam onto said sheet material.

9. The system of claim 1, further comprising:
   a sensor mounted to sense the force applied by said bonding tool to the sheet material during bonding of said adjacent layer; and
   wherein said controller electronically controls the position of said bonding tool with respect to said work station in accordance with the force sensed by said sensor.

10. The system of claim 1, further comprising:
    a temperature sensor mounted to sense the temperature of an exposed layer of sheet material that has been bonded to other layers; and
    wherein said controller controls the speed of said bonding tool relative to said work station in accordance with the temperature sensed by said temperature sensor.

11. A laminated object manufacturing system for converting sheet material into a three-dimensional object comprised of a plurality of layer of said sheet material, comprising:
    a base frame;
    a reference frame on said base frame, the reference frame comprising at least one reference frame member;
    a work station mounted to position said sheet material;
    a forming tool comprising an X-Y plotter, a laser for producing a laser beam and at least one mirror to receive said laser beam and direct the beam onto said sheet material, wherein said X-Y plotter, said laser, and said mirror are mounted on the same said reference frame member.

12. The system of claim 11, wherein said mirror is mounted in a fixed position with respect to said reference frame and the system further includes a second mirror movably mounted with respect to said reference frame on a portion of said X-Y plotter.

13. The system of claim 11, wherein said reference frame member comprises first and second rail portions disposed on a common support structure portion; and
    a bonding tool movably mounted on said second rail portion, said bonding tool being driven to move relative to said work station so as to bond adjacent layers of said sheet material to each other.

14. The system of claim 13, further comprising:
    a temperature sensor mounted to sense the temperature of an exposed layer of sheet material that has been bonded to other layers; and
    wherein said controller controls the speed of said bonding tool relative to said work station in accordance with the temperature sensed by said temperature sensor.

15. The system of claim 13, further including an infrared sensor mounted on the reference frame above the work station to sense the temperature at one or more points on an exposed layer of sheet material that has been bonded to other layers.

16. The system of claim 11, wherein said reference frame comprises two reference frame members and wherein the work station defines a horizontal work surface, and the two reference frame members are mounted on the base frame in parallel adjacent the work surface, the forming tool and bonding tool being movably mounted on the first and second rail portions, respectively, of both reference frame members.

17. The system of claim 11, further including an elongated knife duct and an elongated vacuum duct positioned on opposite sides of the work station and a blower fan adapted to blow air through the knife duct across the work station to the exhaust duct to remove unwanted smoke or other particles from above the work station which might interfere with the operation of the laser.

18. The system of claim 11, wherein the reference frame comprises two reference frame members each having rail portions disposed on a support structure portion, and the X-Y plotter comprises motor driven pulleys and belts attached to X-axis carriages mounted on linear bearings to said rail portions.

19. The system of claim 18, wherein the X,Y plotter additionally comprises a lateral support mounted across the reference frame members and including a rail, each end of the lateral support being mounted to one of said X-axis carriages and adapted to slide linearly along the rail portions of the reference frame members, the forming tool being mounted to a Y-axis carriage adapted to slide linearly along the rail of the lateral support.

20. A laminated object manufacturing system for converting sheet material into a three-dimensional object comprised of a plurality of layers of said sheet material, comprising:

a work station mounted to position said sheet material;

a forming tool mounted to move relative to said work station to form said layers from the sheet material;

a bonding tool mounted to move relative to said work station to apply force and bond adjacent layers of sheet material to each other to form said three-dimensional object;

at least two spaced sensors on said bonding tool mounted to sense the force applied by said bonding tool to the sheet material during bonding of said adjacent layers;

a controller which electronically controls the position of said bonding tool with respect to said work station in accordance with the force sensed by said sensor to ensure proper bonding of the adjacent layers of sheet material.

21. The system of claim 20, wherein said reference frame comprises two reference frame members and wherein the work station defines a horizontal work surface, and the two reference frame members are mounted on the base frame in parallel adjacent the work surface, the bonding tool being movably mounted across the reference frame members.

22. The system of claim 21, wherein said two reference frame members include rail portions and wherein said bonding tool comprises a roller spring-mounted on each end to a carriage adapted to slide on said rail portions, and said sensors comprise position sensors for sensing the relative position of each end of the roller with respect to the associated carriage, which along with the spring constants of the spring mounts is used to determine the force applied by said roller to the sheet material.

23. A laminated object manufacturing system for converting sheet material into a three-dimensional object comprised of a plurality of layers of said sheet material, comprising:

a work station adapted to position said sheet material;

a forming tool mounted to move relative to said work station to form said layers from the sheet material;

a bonding tool mounted to move relative to said work station to bond adjacent layers of sheet material to each other to form said three-dimensional object;

a temperature sensor mounted to sense the temperature of an exposed layer of sheet material that has been bonded to other layers; and a controller which controls the application of heat to a layer of sheet material that is applied to said exposed layer, said controller controlling said application of heat in accordance with the temperature sensed by said temperature sensor.

24. The system of claim 23, wherein the temperature sensor comprises an infrared sensor.

25. The system of claim 23, further including a reference frame comprising two reference frame members and wherein the work station defines a horizontal work surface, and the two reference frame members are mounted on the base frame in parallel adjacent the work surface, the system further including:

an X-Y plotter mounted on said reference frame members and defining a portion of said forming tool, wherein said temperature sensor is mounted on said X-Y plotter over said horizontal work surface.

26. The system of claim 25, wherein the reference frame members each have rail portions disposed on a support structure portion, and the X-Y plotter comprises motor driven pulleys and belts attached to X-axis carriages mounted on linear bearings to said rail portions, the X,Y plotter additionally comprising a lateral support mounted across the reference frame members, wherein said temperature sensor is mounted on said lateral support.

27. The system of claim 23, wherein said bonding tool applies said heat to said layer of sheet material that is applied to said exposed layer.

28. The system of claim 23, wherein said controller controls the speed of said bonding tool relative to said work station in accordance with the temperature sensed by said temperature sensor.

29. A method of converting sheet material into a three-dimensional object comprised of a plurality of layers, including the steps of:

positioning said sheet material over a work station;

forming a layer from the sheet material using a forming tool movably mounted over the work station;

bonding said formed layer to an adjacent layer of sheet material to result in a bonded layer using a bonding tool movably mounted over the work station;

sensing the temperature of the sheet material;

adjusting the speed of the bonding tool on a subsequent bonding step based on the temperature sensed.

30. The method of claim 29, further comprising the steps of:

monitoring the speed of the bonding tool relative to a maximum reference speed; and reducing the temperature of the bonding tool when the speed of the bonding tool reaches said reference speed.

31. The method of claim 29, further comprising the steps of:

monitoring the speed of the bonding tool relative to a minimum reference speed; and increasing the temperature of the bonding tool when the speed of the bonding tool reaches said reference speed.

32. The method of claim 29, wherein said step of sensing comprises sensing the temperature of the formed layer before said formed layer is bonded to an adjacent layer.

33. The method of claim 29, wherein said step of sensing comprises sensing the temperature of the bonded layer.

34. The method of claim 29, wherein said step of sensing comprises sensing the temperature of said sheet material at more than one position between said steps of bonding.

35. A method of converting sheet material into a three-dimensional object comprised of a plurality of layers of said sheet material, comprising the steps of:

positioning said sheet material over a work station;

forming a layer from the sheet material using a forming tool movably mounted over the work station;

bonding said formed layer to an adjacent layer of sheet material using a bonding tool movably mounted over the work station;

sensing the force applied by the bonding tool to the sheet material during bonding of said layer; and controlling the position of the bonding tool with respect to the work station in accordance with the force sensed by the sensor.

36. The method of claim 35, wherein said bonding tool is a roller and said step of sensing comprises sensing the force at both ends of said roller applied by contact between said roller and said formed layer.

37. The method of claim 36, wherein said roller is spring-mounted at both ends to a movable carriage and the step of sensing comprises sensing the relative position of each end of the roller with respect to the carriages, which, along with the spring constants of the spring mounts, is used to determine the force applied by said roller to the sheet material.

38. A laminated object manufacturing system for converting sheet material into a three-dimensional object comprised of a plurality of layers of said sheet material, comprising:

a work station adapted to position said sheet material;

a forming tool mounted to move relative to said work station to form said layers from the sheet material;

a bonding tool mounted to move relative to said work station to bond adjacent layers of sheet material to each other, said bonding tool contacting said sheet material in a first position to begin bonding and moving to a second position to complete bonding while maintaining contact with said sheet material between the first and second positions; and first and second rolls, said sheet material extending between the rolls and across the work station, said first roll feeding said sheet material to said work station and said second roll receiving the material from the work station such that material proximate to the work station is under tension, said system releasing the tension after said bonding tool is in said first position, and restoring tension subsequent to said bonding tool reaching said second position.

39. The system of claim 38, wherein said second rail is a windup roll driven by a reversible motor, wherein said motor places said sheet in tension by rotation in a first direction, and releases the tension from said sheet by rotating in an opposite direction.

40. The system of claim 38, wherein said second roll is a pinch roll mounted on a top surface of said system adjacent said work station, the system further including a third roll which receives said sheet material from said pinch rolls and stores said sheet material, said pinch roll being driven by a reversible motor wherein the tension is applied to the sheet by rotating the motor in a first direction, and the tension is released from the sheet by rotating the motor in an opposite direction.

41. A method of converting sheet material into a three-dimensional object comprised of a plurality of layers, comprising:

sensing the temperature of an exposed layer of sheet material that has been bonded to other layers to form a portion of said object;

applying a subsequent layer of sheet material to said exposed layer;

heating said subsequent layer;

controlling the heating of the subsequent layer in accordance with the sensed temperature of said exposed layer.

* * * * *

UNITED STATES PATENT AND TRADEMARK OFFICE
CERTIFICATE OF CORRECTION

PATENT NO. : 5,730,817
DATED : March 24, 1998
INVENTOR(S) : Feygin et al.

It is certified that error appears in the above-indentified patent and that said Letters Patent is hereby corrected as shown below:

Column 14, line 14, please change "plurality of layer" to --plurality of layers--.

Signed and Sealed this

Twenty-sixth Day of October, 1999

Attest:

Q. TODD DICKINSON

Attesting Officer    Acting Commissioner of Patents and Trademarks